US009738280B2

United States Patent
Rayes

(10) Patent No.: US 9,738,280 B2
(45) Date of Patent: Aug. 22, 2017

(54) ADAPTIVE CRUISE CONTROL WITH ON-RAMP DETECTION

(71) Applicant: Robert Bosch GmbH, Stuttgart (DE)

(72) Inventor: Freddy Rayes, Madison Heights, MI (US)

(73) Assignee: Robert Bosch GmbH, Stuttgart (DE)

( * ) Notice: Subject to any disclaimer, the term of this patent is extended or adjusted under 35 U.S.C. 154(b) by 91 days.

(21) Appl. No.: 14/045,319

(22) Filed: Oct. 3, 2013

(65) Prior Publication Data

US 2015/0100216 A1    Apr. 9, 2015

(51) Int. Cl.
*B60W 30/14* (2006.01)
*G01S 13/86* (2006.01)
*G01S 13/93* (2006.01)

(52) U.S. Cl.
CPC ......... *B60W 30/143* (2013.01); *G01S 13/867* (2013.01); *G01S 13/931* (2013.01); *B60K 2310/244* (2013.01); *G01S 2013/9353* (2013.01); *G01S 2013/9375* (2013.01)

(58) Field of Classification Search
CPC  B60W 30/0953; B60W 30/143; G01S 13/867
USPC ......................................................... 701/96
See application file for complete search history.

(56) References Cited

U.S. PATENT DOCUMENTS

| 5,761,630 | A | 6/1998 | Asanuma et al. |
| 7,260,465 | B2 | 8/2007 | Waldis et al. |
| 8,214,125 | B2 | 7/2012 | Nanami |
| 2007/0142995 | A1* | 6/2007 | Wotlermann .................... 701/96 |
| 2007/0150196 | A1* | 6/2007 | Grimm .......................... 701/301 |
| 2010/0228419 | A1* | 9/2010 | Lee et al. ......................... 701/25 |
| 2012/0330528 | A1 | 12/2012 | Schwindt et al. |
| 2013/0099911 | A1* | 4/2013 | Mudalige ............... G08G 1/163 340/438 |
| 2014/0257686 | A1* | 9/2014 | Feldman ................. G06F 17/00 701/300 |

FOREIGN PATENT DOCUMENTS

| DE | 10238936 | 3/2004 |
| EP | 1632384 | 3/2006 |
| JP | 2006176069 | 6/2006 |

OTHER PUBLICATIONS

International Search Report and Written Opinion for Application No. PCT/EP2014/069409 dated Dec. 15, 2014.

(Continued)

*Primary Examiner* — Basil T Jos
(74) *Attorney, Agent, or Firm* — Michael Best & Friedrich LLP

(57) ABSTRACT

Methods and systems for controlling the speed of a host vehicle during an on-ramp merging situation. One method includes identifying a position of an upcoming on-ramp merging with a lane where the host vehicle is currently traveling based on lane markings identified in an image captured by a forward-facing image sensor mounted on the host vehicle, detecting a merging vehicle on the upcoming on-ramp, and determining a speed of the merging vehicle. The method also includes automatically, at a control unit, adjusting a speed of the host vehicle based on the speed of the merging vehicle.

20 Claims, 10 Drawing Sheets

(56) References Cited

OTHER PUBLICATIONS

Dan Marinescu et al: "On-ramp traffic merging using cooperative intelligent vehicles: A slot-based approach". Intelligent Transportation Systems (ITSC). 2012 15th International IEEE Conference on. IEEE. Sep. 16, 2012. pp. 900-906.
Chang Yang et al: "Homing Guidance of On-Ramp Vehicles for Safe Merging". Proceedings of the American Control Conference (ACC). Chicago. June 24-26, 1992; [Proceedings of the American Control Conference (ACC)]. New York. IEEE. US. Jun. 24, 1992. pp. 1773-1776.

* cited by examiner

ADAPTIVE CRUISE CONTROL WITH ON-RAMP DETECTION

BACKGROUND

The present invention relates to systems and methods for performing adaptive cruise control.

SUMMARY

Traditional cruise control systems control the speed of a host vehicle at a user-set level. Adaptive cruise control ("ACC") systems also control the speed of a host vehicle at a user-set level. However, ACC systems automatically decrease a host vehicle's speed below the user-set level when a vehicle is detected in front of the host vehicle within a predetermined distance. Accordingly, ACC systems prevent the host vehicle from colliding with a vehicle located in front of the host vehicle that is traveling slower than the user-set level.

ACC systems, however, may not be able to properly handle a merging vehicle situation from an on-ramp, such as on a highway. For example, an ACC system in a host vehicle may not detect a merging vehicle as a vehicle in the same lane as the host vehicle. Therefore, the ACC system typically will not adjust the host vehicle's speed based on the presence of the merging vehicle. Accordingly, to allow the merging vehicle to enter the host vehicle's lane, the user usually has to override or cancel the ACC system (e.g., by manually braking the host vehicle).

Accordingly, embodiments of the invention provide systems and methods for performing adaptive cruise control to automatically perform longitudinal control of a host vehicle to account for merging vehicles (e.g., entering a highway using an on-ramp initially running parallel to the host vehicle's current lane of travel). By automatically controlling the host vehicle to account for merging vehicles, driver interaction is reduced and the usefulness of ACC is improved. In particular, embodiments of the invention provide methods to (i) detect an upcoming on-ramp using lane markings captured by at least one image sensor, (ii) detect a merging vehicle on the upcoming on-ramp (e.g., using radar data), (iii) determine a relative speed of the merging vehicle on the upcoming on-ramp, and (iv) automatically accelerate or brake a host vehicle based on the relative speed of the merging vehicle to automatically allow the merging vehicle to enter the host vehicle's current lane of travel.

In particular, one embodiment of the invention provides a method of controlling the speed of a host vehicle. The method includes receiving a position of an upcoming on-ramp merging with a lane where the host vehicle is currently traveling based on lane markings identified in an image captured by a forward-facing image sensor mounted on the host vehicle, detecting a merging vehicle on the upcoming on-ramp, and determining a speed of the merging vehicle. The method also includes automatically, at a control unit, adjusting a speed of the host vehicle based on the speed of the merging vehicle.

Another embodiment of the invention provides a system for controlling a speed of a host vehicle. The system includes a control unit, at least one forward-facing image device mounted on the host vehicle, and at least one distance-sensing device mounted on the host vehicle. The at least one forward-facing image device configured to capture an image, identify lane markings in the image indicating an upcoming on-ramp merging with a lane where the host vehicle is currently traveling, and transmit a first signal to the control unit based on a position of the identified upcoming on-ramp. The at least one distance-sensing device configured to detect a merging vehicle on the upcoming on-ramp, determine a speed of the merging vehicle, determine a position of the merging vehicle, and transmit a second signal to the control unit based the speed of the merging vehicle and the position of the merging vehicle. The control unit is configured to automatically adjust a speed of the host vehicle based on the first and second signal.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
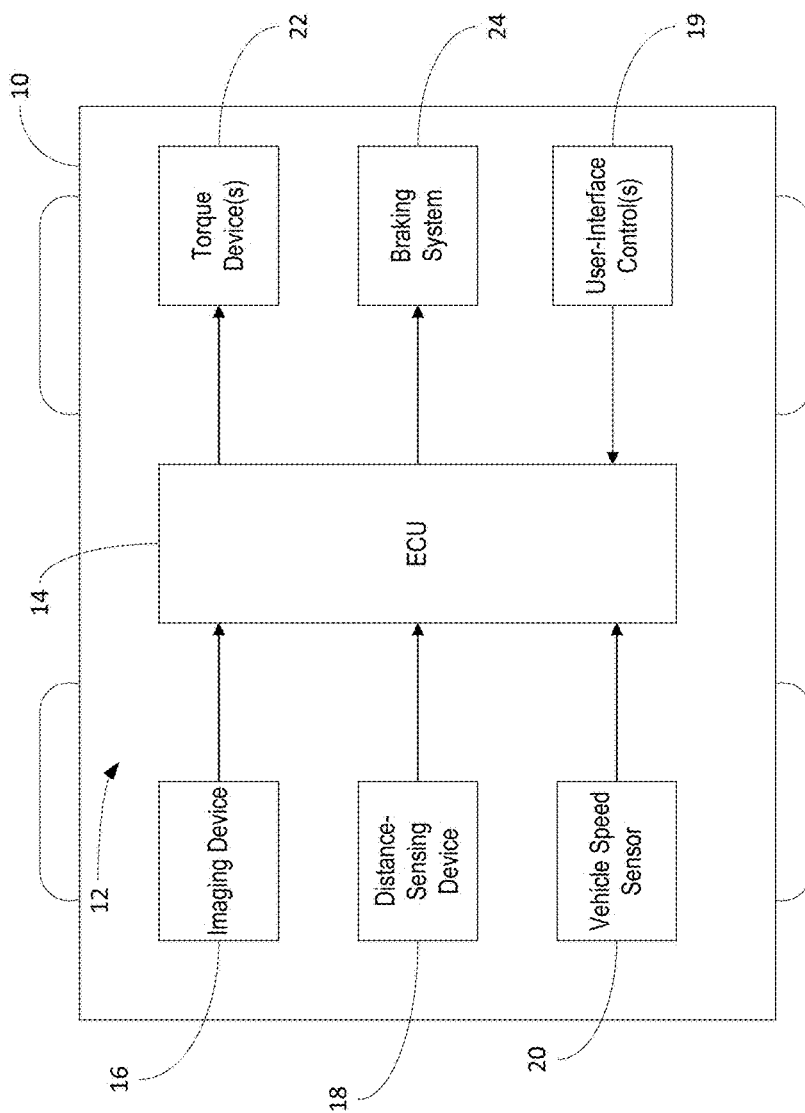
FIG. 1 schematically illustrates a host vehicle including an adaptive cruise control system.

FIG. 1 illustrates a host vehicle 10 equipped with an adaptive cruise control ("ACC") system 12. ACC systems operate similar to traditional cruise control systems. In particular, an ACC system is activated by a user-interface control (e.g., one or more buttons or levers) that can be mounted on or adjacent to the steering wheel. Using the user-interface control, the user can enable and disable the ACC system, set a target speed of the vehicle, or adjust a previously-set target speed. Additionally, the user can press or activate the brake pedal to disable the cruise control system.

Once the ACC system is activated and a target speed is set, the ACC system monitors the vehicle's speed. If the vehicle's speed falls below the target speed, ACC systems cause the vehicle to accelerate until the vehicle speed reaches the target speed. Alternatively, if the vehicle speed increases above the target speed, ACC systems causes the vehicle to decelerate either by applying a braking force or by reducing the "throttle input" until the vehicle speed reaches the target speed.

In addition to maintaining a vehicle at a target speed, ACC systems use sensing equipment to detect other objects located around the vehicle, e.g., a vehicle preceding the user's vehicle (i.e., the host vehicle) in the same lane. For example, if a user activates an ACC system for the host vehicle and sets the target speed to 60 miles per hour ("mph") and the host vehicle approaches a slower-moving target vehicle in the same driving lane as the host vehicle, the ACC system causes the host vehicle to slow down. The ACC system also controls the speed of the host vehicle to maintain a predetermined distance between the host vehicle and the target vehicle. The predetermined distance can be based on user selections, sensed weather conditions, sensed road conditions, and other factors. Accordingly, an ACC system controls the speed of a host vehicle to be the lesser of 1) the speed necessary to maintain the predetermined distance and 2) the user-set target speed. If the host vehicle changes lane or the target vehicle changes lanes or otherwise is no longer detected by the ACC system, and no new target vehicle within the predetermined distance is detected, the ACC systems causes the host vehicle to accelerate and maintain the target speed.

Returning to FIG. 1, the ACC system 12 includes an electronic control unit ("ECU") 14 that includes a processor, a microprocessor, an application-specific integrated circuit ("ASIC"), or a similar device. The ACC system 12 also includes an imaging device 16, a distance-sensing device 18, one or more user-interface controls 19, and a vehicle speed sensor 20. In some embodiments, the ECU 14 communicates with the imaging device 16, the distance-sensing device 18, the user-interface controls 19, and the vehicle speed sensor 20 over a bus, such as a controller area network ("CAN") bus. Other connections between the components, whether wired, wireless, direct, or indirect, are also possible. Also, in some embodiments, the ECU 14 can be integrated with the distance-sensing device 18.

The imaging device 16 includes at least one forward-facing video camera mounted on the host vehicle 10. Accordingly, the imaging device 16 obtains images of an area generally in front of the host vehicle 10. The imaging device 16 can be configured to process captured images to identify or classify merges lanes or other information and transmit information or signals to the ECU 14 relating to the identified lanes (e.g., a position of the lane, a point where the lane merges with the host vehicle's current lane, etc.). Alternatively, the images captured by the imaging device 16 can be transmitted to the ECU 14 for further processing. Also, in some embodiments, the imaging device 16 and/or the ECU 14 can optionally be configured to use information from a navigation system (e.g., a global positioning system ("GPS)) to identify or verify previously-identified merging lanes. For example, the imaging device 16 and/or the ECU 14 can use navigational information to improve image analysis, such as by assigning a probability to detected merging lanes to lower the occurrence of false positives.

It should also be understood that in some embodiments the imaging device 16 includes more than one image sensor (e.g., multiple still and/or video cameras) that are mounted on the host vehicle 10. For example, in some embodiments, multiple video cameras are used to capture images of approximately 360 degrees around the host vehicle 10.

The distance-sensing device 18 can include one or more radar devices mounted to the host vehicle 10 that detect reflected radio waves. The radar devices are used to detect objects located around the host vehicle 10 (e.g., within a predetermined distance). For example, the distance-sensing device 18 can include one or more front-facing radar devices (e.g., used to perform adaptive cruise control as described above), one or more radar devices mounted on one or more corners of the host vehicle 10, one or more rear-facing radar devices, or combinations thereof. It should be understood, however, that the distance-sensing device 18 can include various arrangements of radar devices configured to detect objects around the host vehicle 10. Also, the distance-sensing device 18 can use technology other than radar to detect objects around the host vehicle 10. For example, in some embodiments, the distance-sensing device 18 can include, in addition to or as an alternative to a radar device, a lidar device that uses light waves to detect and range objects located around the host vehicle 10 (e.g., to perform approximately 360-degree distance measurements). As described in more detail below, the ECU 14 uses data from the distance-sensing device 18 to detect a merging vehicle in on upcoming on-ramp.

The vehicle speed sensor 20 can include a wheel speed sensor or other sensor for detecting a current speed of the host vehicle 10. It should be understood that the ACC system 12 can include additional sensors, such as yaw-rate sensor(s) and steering angle sensor(s), that are used by the system 12 (e.g., the ECU 14) to perform ACC control (e.g., course prediction).

The user-interface controls 19 include one or more buttons or levers mounted in the host vehicle 10 (e.g., on or adjacent to the steering wheel). As noted above, a user of the host vehicle 10 uses the controls 19 to enable and disable ACC functionality, set a target speed of the host vehicle 10, or adjust a previously-set target speed. Additionally, the ECU 14 can communicate with the brake pedal 10 of the host vehicle 10. In particular, as noted above, a user can press or activate the brake pedal to disable the ACC functionality performed by the ECU 14.

As illustrated in FIG. 1, the ECU 14 also communicates with one or more torque devices 22 (e.g., one or more engine actuator(s) and/or electric motors) and a braking system 24 included in the vehicle 10 (e.g., over the CAN bus). The engine actuator(s) 22 include actuators for increasing or decreasing engine torque. For example, as described above, the ECU 14 can increase engine output to increase the host vehicle's speed to the target speed. Similarly, the ECU 14 can decrease engine output to decrease the host vehicle's speed to a target speed or a speed less than the target speed (e.g., when a vehicle is detected in front of the host vehicle 10). In some embodiments, the engine actuator(s) 22 include an engine controller that controls operation of engine actuators. To decrease the host vehicle's speed, the ACC system 12 can also instruct the vehicle's braking system 24 to apply one or more vehicle brakes (e.g., frictional braking, regenerative braking, or a combination thereof).

Figure 2:
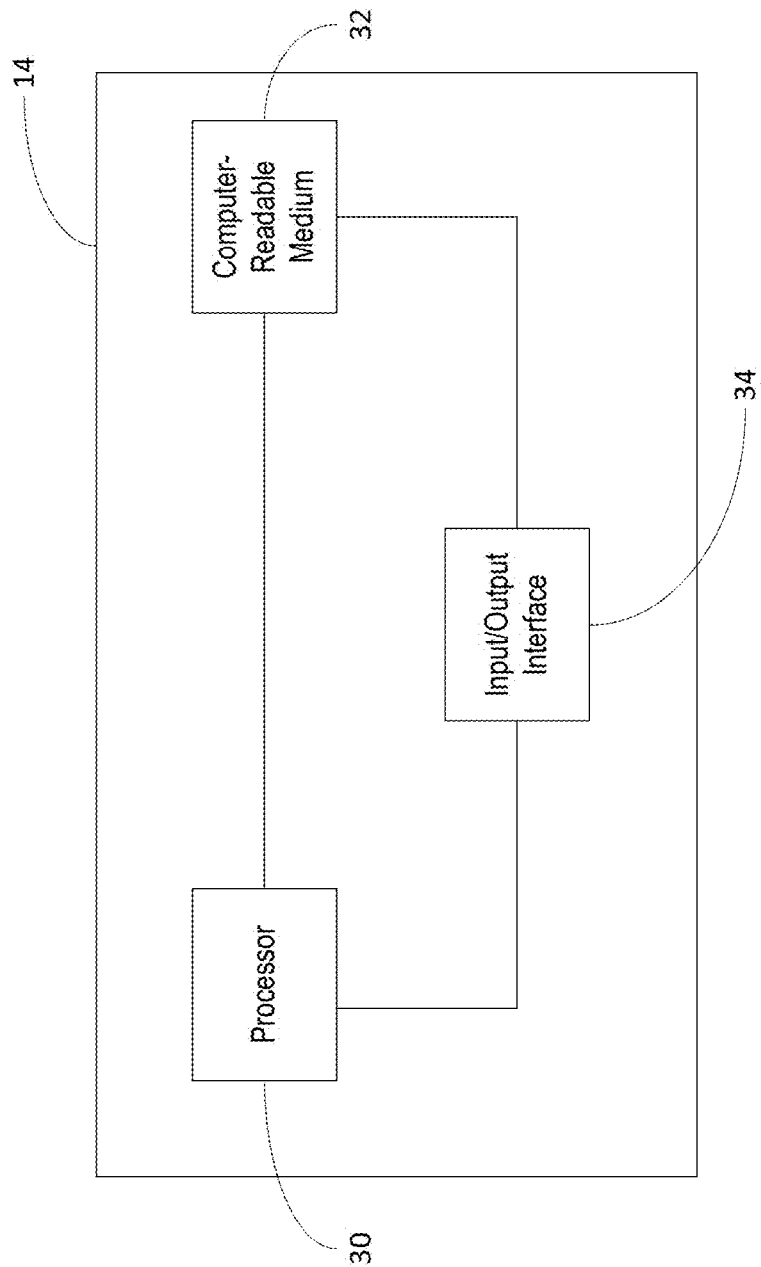
FIG. 2 schematically illustrates an electronic control unit included in the adaptive cruise control system of FIG. 1.

As illustrated in FIG. 2, in one embodiment, the ECU 14 includes a processor 30, non-transitory computer-readable medium 32, and an input/output interface 34. The computer-readable medium 32 can include random access memory ("RAM") and/or read-only memory ("ROM"). The input/output interface 34 transmits and receives information from devices and systems external to the ECU 14 (e.g., over the CAN bus). In particular, as noted above, the ECU 14 communicates with the imaging device 16, the distance-sensing device 18, the vehicle speed sensor 20, the engine actuator(s) 22, and the braking system 24 over the CAN bus through the input/output interface 34.

The processor 30 receives information (e.g., from the medium 32 and/or the input/output interface 34) and processes the information by executing one or more instructions or modules. The instructions or modules are stored in the computer-readable medium 32. The processor 30 also stores information (e.g., information received from the bus or information generated by instructions or modules executed by the processor 30) to the medium 32. It should be understood that although only a single processor, input/output interface, and computer-readable media module are illustrated in FIG. 2, the ECU 14 can include multiple processing units, memory modules, and/or input/output interfaces. Also, in some embodiments, the functionality of the ECU 14 described below can be distributed among multiple control units.

The instructions stored in the computer-readable medium 32 provide particular functionality when executed by the processor 30. In general, the instructions, when executed by the processor 30, use information from the imaging device 16, the distance-sensing device 18, and the vehicle speed sensor 20 to perform adaptive cruise control and automatically control the speed of the host vehicle 10 in merging situations.

Figure 3:
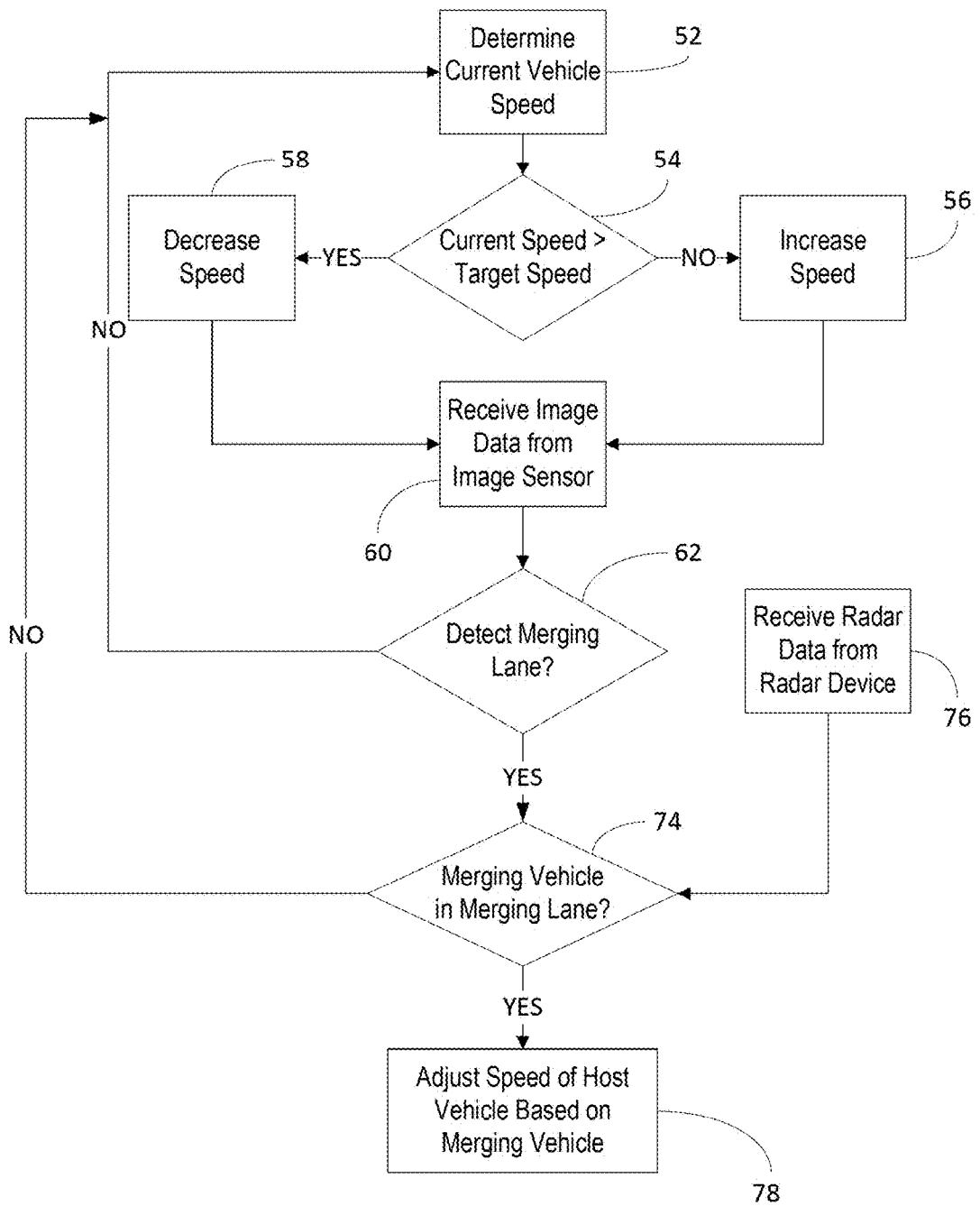
FIG. 3 is a flow chart illustrating a method of performing adaptive cruise control to account for merging vehicles performed by the adaptive cruise control system of FIG. 1.

For example, FIG. 3 illustrates a method 50 of performing adaptive cruise control to account for merging vehicles performed by the ACC system 12. As illustrated in FIG. 3, when the ACC system 12 is activated and a target speed is set, the ECU 14 monitors the current speed of the host vehicle 10 (at block 52). In particular, the ECU 14 receives data from the vehicle speed sensor 20 and processes the data to determine the current speed. As performed with traditional cruise control, the ECU 14 compares the current speed to the target speed (at block 54). When the current speed is less than the target speed, the ECU 14 increases the host vehicle's speed (e.g., by communicating with the engine actuator(s) 22 to increase engine output) (at block 56). Alternatively, when the current speed is greater than the target speed, the ECU 14 decreases the host vehicle's speed (e.g., by communicating with the engine actuator(s) 22 and/or the braking system 24) (at block 58).

Figure 4:
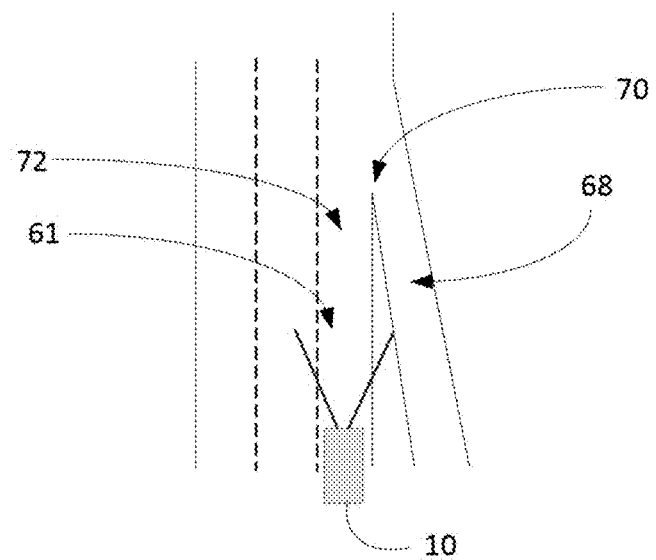
FIG. 4 schematically illustrates the host vehicle of FIG. 1 traveling in a lane with an upcoming on-ramp.
Figure 5A:
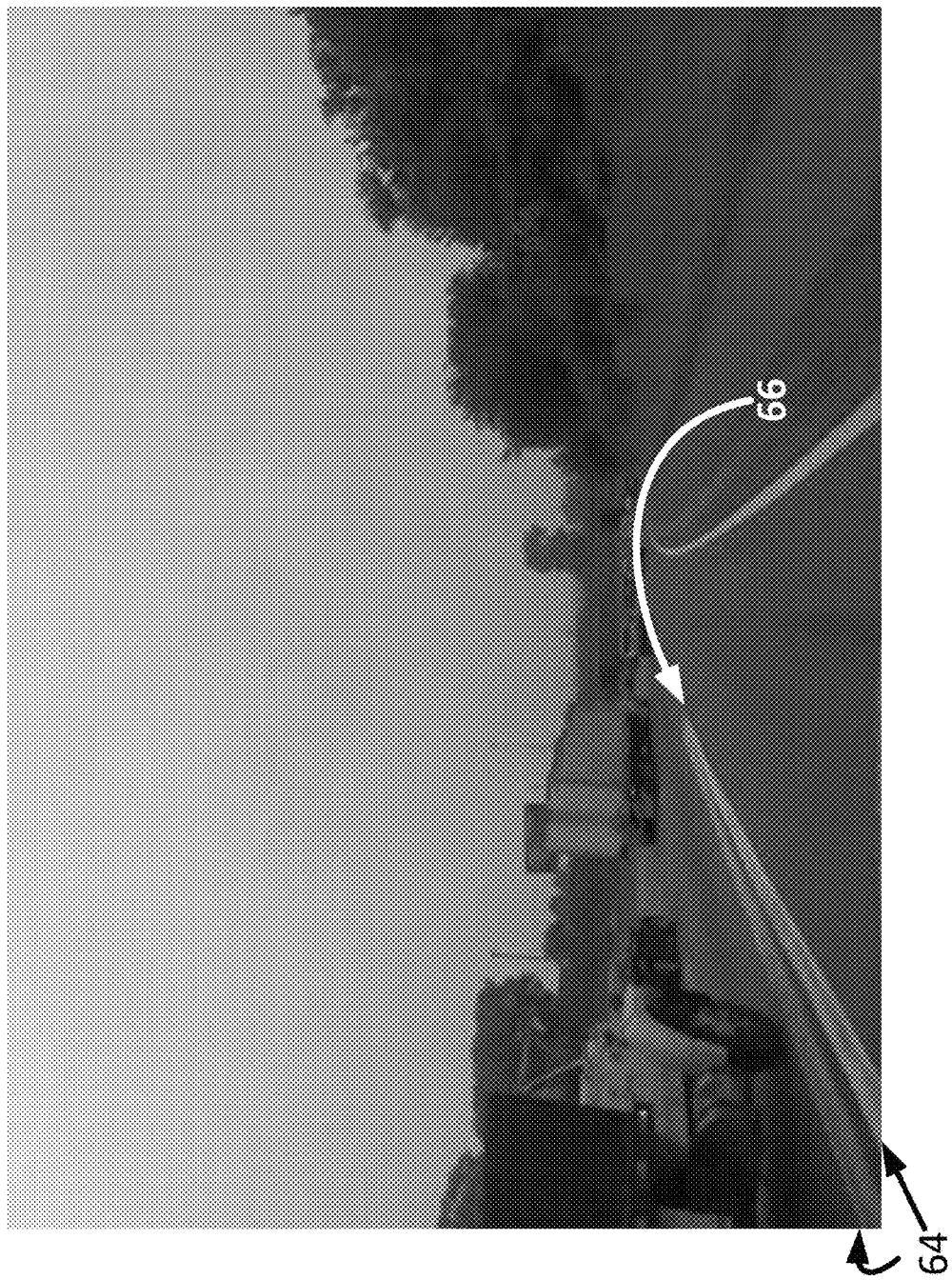
FIG. 5a is a sample image captured by a forward-facing image sensor included in a host vehicle when the host vehicle is traveling on an on-ramp (i.e., the host vehicle is the merging vehicle).
Figure 5B:
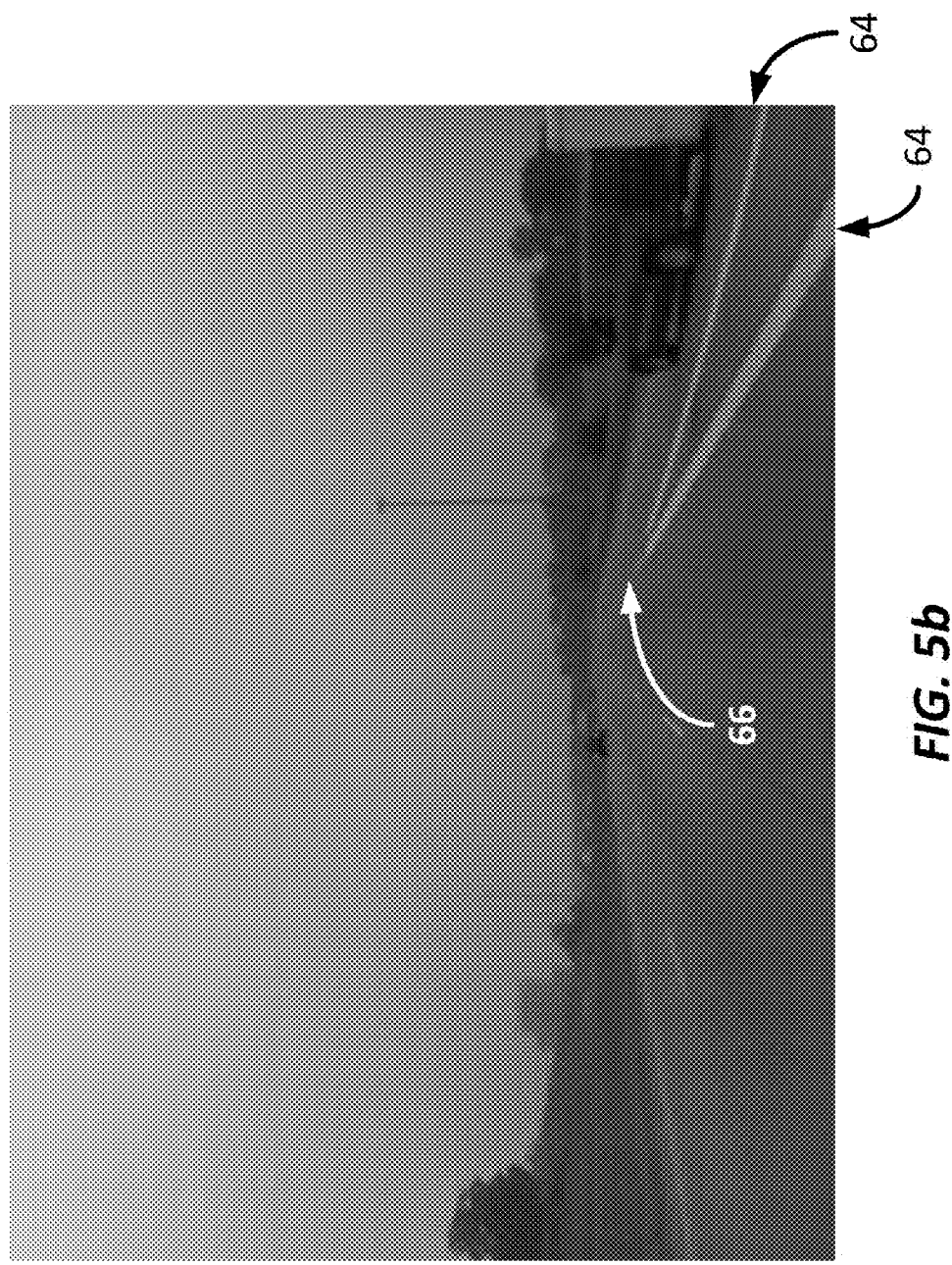
FIG. 5b is a sample image capture by a forward-facing image sensor included in a host vehicle when the host vehicle is traveling in a lane adjacent to an on-ramp (i.e., the host vehicle is not the merging vehicle).

The ECU 14 also receives image data from the imaging device 16 (at block 60). For example, as illustrated in FIG. 4, the imaging device 16 can have a field of view 61 that allows the imaging device 16 to capture an image (or a plurality of images) of an area located in front of and on the sides of the host vehicle 10. As described above, the imaging device 16 can be configured to process the captured images to identify whether there is an upcoming on-ramp (at block 62). In particular, the imaging device 16 can process captured images to identify a predetermined pattern of lane markings that mark a merging location between the lane where the host vehicle 10 is currently traveling and an adjacent lane, such as an on-ramp. For example, the imaging device 16 can be configured to detect double (e.g., white) lines converging to a point or a merge location followed by a missing lane. The imaging device 16 can also detect yellow lines to detect boundaries. For example, FIGS. 5a and 5b illustrate sample image data collected by the imaging device 16 that includes double white lines 64 converging to a point or merge location 66 after which there are no or limited lane markings that indicate that both lanes still exist. As noted above, the imaging device 16 can also optionally use data from a GPS system to identify an upcoming on-ramp.

If the imaging device 16 detects the merging lines in the image data, the imaging device 16 defines a merging lane 68 positioned adjacent to the host vehicle 10 based on the merging lines (e.g., to the right or the left of the host vehicle 10). For example, the identified merging lane 68 for the situation illustrated in FIG. 4 is on the right of the host vehicle 10. However, it should be understood that the imaging device 16 can be used to detect a merging lane on either side of the host vehicle 10. As illustrated in FIG. 4, the merging lane 68 has a merge location 70 where the merging lane 68 merges with the lane 72 that the host vehicle 10 is currently traveling in. The imaging device 16 transmits a signal to the ECU 14 relating to the identified merging lane 68 (e.g., the location of the merging lane 68 (e.g., right or left of the host vehicle 10), a distance between the host vehicle 10 and the merging lane 68, a position of the merge location 70 relative to the host vehicle 10, etc.). Alternatively, as noted above, the ECU 14 can be configured to receive image data from the imaging device 16 and process the image data to identify the merging lane 68 and the merge location.

Based on an identified merging lane 68, the ECU 14 identifies whether a merging vehicle 80 is present in the merging lane 68 (at block 74). In particular, the ECU 14 uses data received from the distance-sensing device 18 (at block 76) to identify whether another vehicle (hereinafter referred to as a "merging vehicle") is present in the merging lane. For example, the ECU 14 can use data from the distance-sensing device 18 to identify whether a vehicle is located to the left or right of the vehicle (depending on which side of the host vehicle 10 the merging lane 68 was identified) within a predetermined distance of the host vehicle 10. It should be understood that, in some embodiments, rather than receiving radar data directly from the radar sensor 18, the ECU 14 receives information from another control unit that processes radar data from the radar device 18. For example, the ECU 14 can use information from a blind spot detection control unit to determine whether a merging vehicle 80 is in the merging lane 68.

Figures 6, 7:
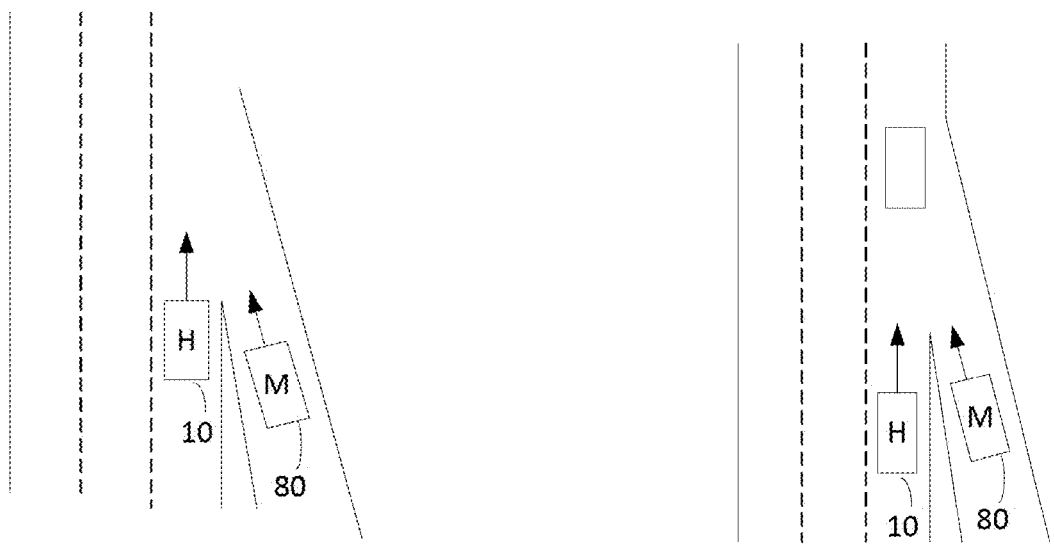
FIG. 6 schematically illustrates vehicle speed control performed by the adaptive cruise control system of FIG. 1 to increase the speed of the host vehicle to account for a merging vehicle on an upcoming on-ramp.
FIG. 7 schematically illustrates vehicle speed control performed by the adaptive cruise control system of FIG. 1 to decrease the speed of the host vehicle to account for a merging vehicle on an upcoming on-ramp.

If the ECU 14 identifies a merging vehicle 80 in the merging lane 68 (at block 74), the ECU 14 automatically adjusts a speed of the host vehicle 10 based on the identified merging vehicle 80 (at block 78). For example, as illustrated in FIG. 6, the speed of the host vehicle 10 can be increased to avoid a collision with the merging vehicle 80. Alternatively, as illustrated in FIG. 7, the speed of the host vehicle 10 can be decreased to avoid a collision with the merging vehicle 80. The ECU 14 can apply various algorithms to determine whether the host vehicle's speed should be increased or decreased. For example, the ECU 14 can be configured to determine the speed of the merging vehicle 80 (e.g., relative to the host vehicle 10). When the merging vehicle 80 is traveling at a speed less than the host vehicle 10 (e.g., the merging vehicle 80 has a relative velocity less than zero), the ECU 14 can increase the host vehicle's speed. Alternatively, when merging vehicle 80 is traveling at the same or a greater speed than the host vehicle 10 (e.g., the merging vehicle 80 has a relative velocity of zero or greater), the ECU 14 can decrease the host vehicle's speed.

Figure 8:
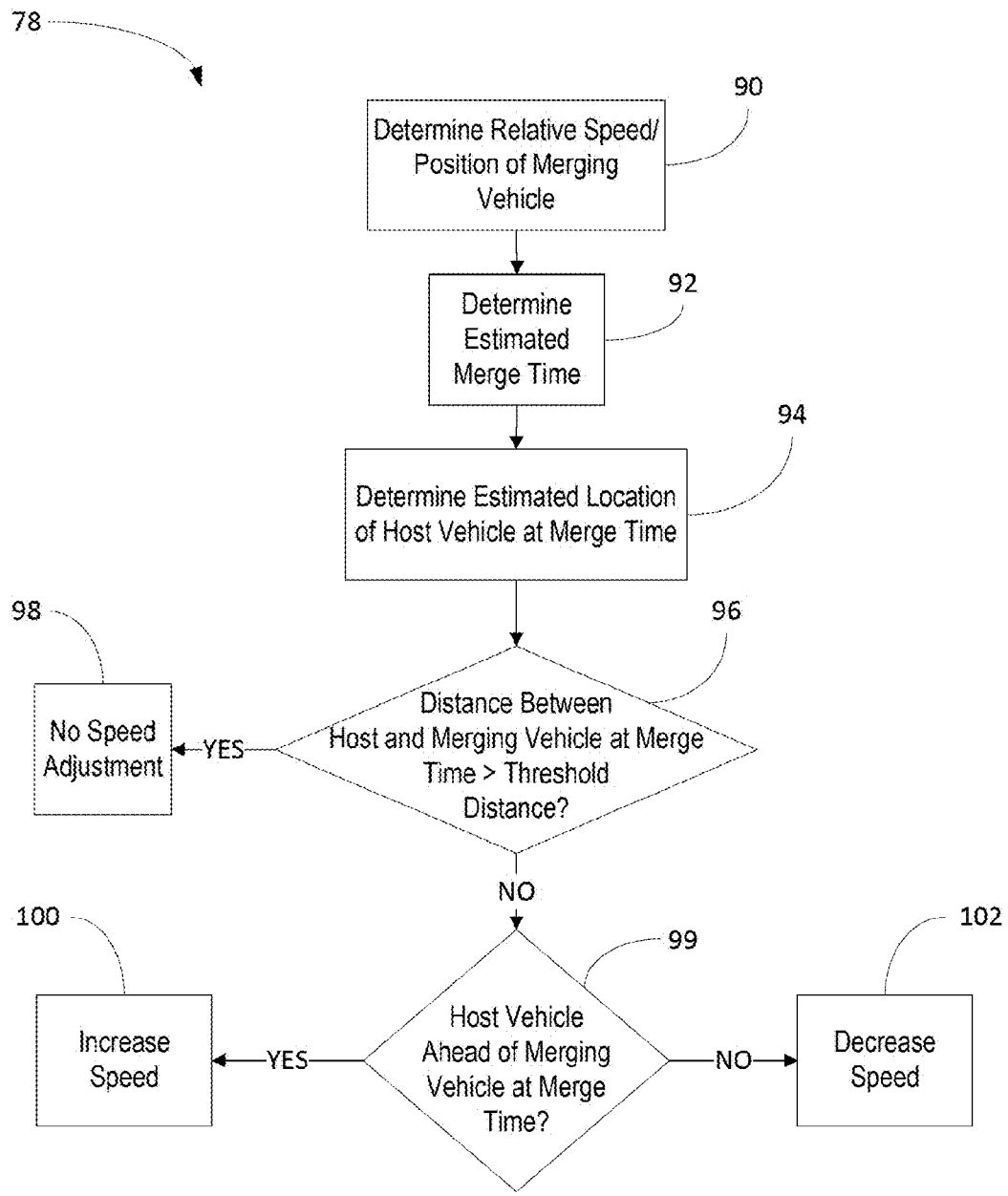
FIGS. 8-9 are flow charts illustrating methods performed by the adaptive cruise control system of FIG. 1 for determining whether to increase or decrease a host vehicle's speed to account for merging vehicles.

FIG. 8 illustrates another method for automatically adjusting the speed of the host vehicle 10. As illustrated in FIG. 8, when a merging vehicle 80 is detected in the merging lane 68, the ECU 14 determines a speed and/or position of the merging vehicle 80 (e.g., a relative speed and/or position with respect to the host vehicle 10) (at block 90). The ECU 14 can use this information to automatically adjust the host vehicle's speed. In particular, as illustrated in FIG. 8, the ECU 14 can be configured to use the merging vehicle's speed and position to determine an estimated time when the merging vehicle 80 will reach the merge location 70 (at block 92). The ECU 14 also determines an estimated position of the host vehicle 10 at the estimated time based on the host vehicle's current speed (e.g., obtained from the vehicle speed sensor 20) and position (e.g., a distance from the merge location) (at block 94). In particular, the ECU 14 determines where the host vehicle 10 will be when the merging vehicle 80 merges with the host vehicle's current driving lane 72. When the distance between the location of the merging vehicle 80 at the estimated time (which is the merge location 70) and the estimated location of the host vehicle 10 at the estimated time is greater than a predetermined threshold distance (at block 96), the ECU 14 determines that there will be sufficient distance between the host vehicle 10 and the merging vehicle 80 when the merging vehicle 80 is at the merge location 70. Therefore, the ECU 14 does not adjust the host vehicle's current speed (at block 98).

Alternatively, when the distance between the location of the merging vehicle 80 at the estimate time (which is the merge location 70) and the estimated location of the host vehicle 10 at the estimated time is less than or equal to the predetermined threshold distance (at block 96), the ECU 14 determines that the host vehicle's speed needs to be adjusted. In particular, when the estimated location of the host vehicle 10 at the estimated time is ahead of or beyond the merge location 70 (at block 99), the ECU 14 determines that the host vehicle 10 will be located ahead of the merging vehicle 80 when the merging vehicle 80 reaches the merge location 70. Accordingly, in this situation, the ECU 14 automatically increases the host vehicle's speed to place the host vehicle 10 ahead of the merging vehicle 80 and avoid a collision (at block 100). Alternatively, when the estimated location of the host vehicle 10 at the estimated time is behind the merge location 70 (at block 99), the ECU 14 determines that the host vehicle 10 will be located behind the merging vehicle 80 when the merging vehicle 80 reaches the merge location 70. Therefore, the ECU 14 automatically decreases the host vehicle's speed to place the host vehicle 10 behind the merging vehicle 80 and avoid a collision (at block 102).

Figure 9:
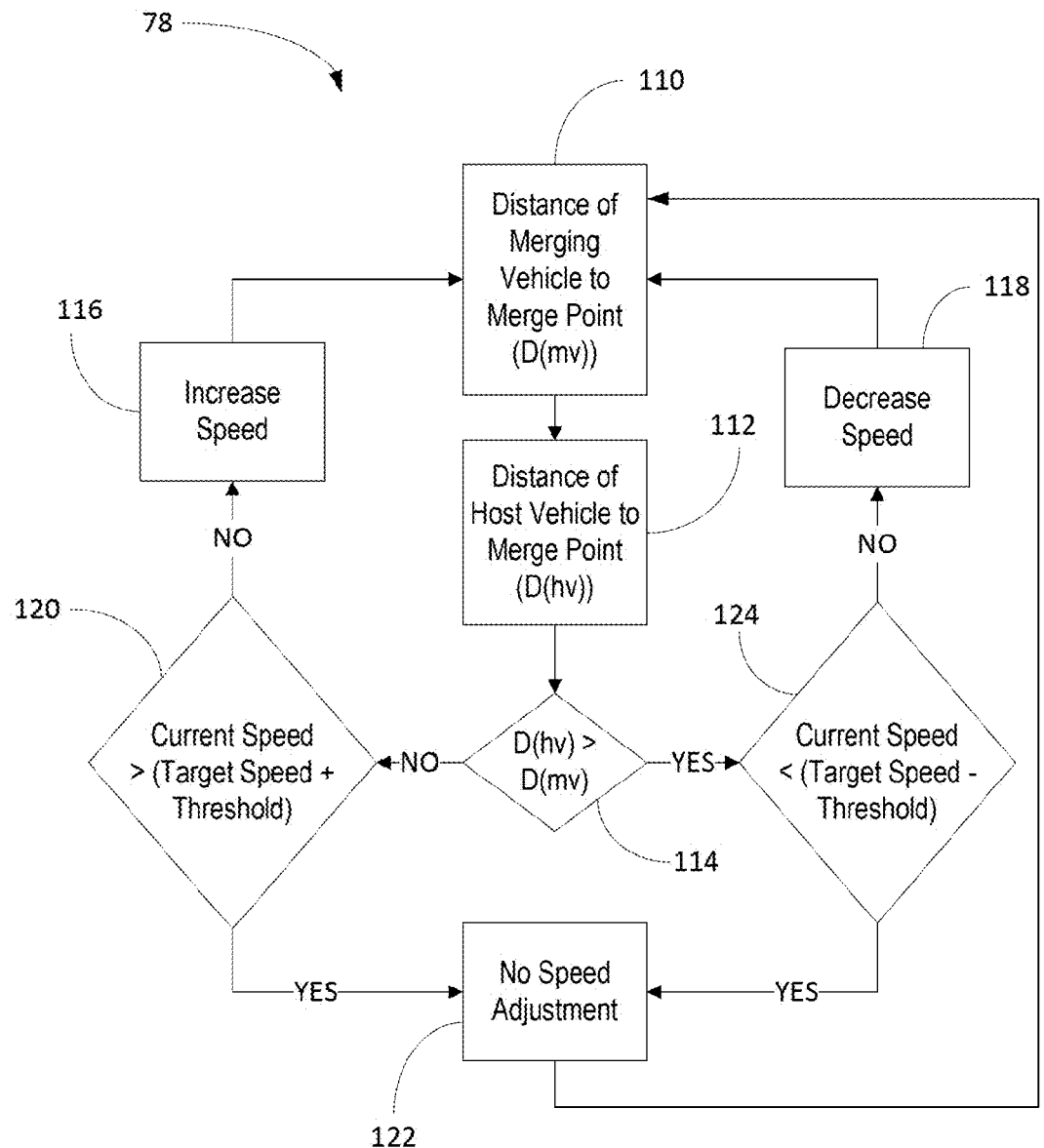

FIG. 9 illustrates another method for automatically adjusting the speed of the host vehicle 10. As illustrated in FIG. 9, when a merging vehicle 80 is detected in the merging lane 68, the ECU 14 determines a distance between the merging vehicle 80 and the merge location 70 (D(mv)) (at block 110). The ECU 14 also determines a distance between the host vehicle 10 and the merge location 70 (D(hv)) (at block 112). The ECU 14 uses the determined distances to determine which vehicle is closer to the merge location 70 (at block 114). When the host vehicle 10 is closer to the merge location 70 (i.e., D(hv)<D(mv)), the ECU 14 automatically increases the host vehicle's speed (at block 116). Alternatively, when the merging vehicle 80 is closer to the merge location 70 (i.e., D(hv)>D(mv)), the ECU 14 automatically decreases the host vehicle's speed (at block 118).

In some embodiments, as illustrated in FIG. 9, when the ECU 14 automatically increases or decreases the host vehicle's speed, the ECU 14 limits the amount of speed increase or decrease. For example, before the ECU 14 increases the host vehicle's speed (at block 116), the ECU 14 can be configured to determine whether the host vehicle's current speed is greater than the sum of the target speed and a predetermined threshold (at block 120). If the current speed is greater than this sum, the ECU 14 does not perform a speed adjustment (at block 122). Similarly, before the ECU 14 decreases the host vehicle's speed (at block 118), the ECU 14 can be configured to determine whether the host vehicle's current speed is less than the difference between the target speed and a predetermined threshold (at block 124). If the current speed is less than this difference, the ECU 14 does not perform a speed adjustment (at block 122). Accordingly, the ECU 14 can perform these checks to make sure that the speed of the host vehicle 10 is not set to an unsafe, uncomfortable, or illegal speed. As illustrated in FIG. 9, in some embodiments, the ECU 14 continuously updates the distances between the merge location and the vehicles. Therefore, the ECU 14 can account for speed changes of either vehicle.

In some embodiments, as illustrated in FIG. 6, a vehicle may be ahead of the host vehicle 10 in the host vehicle's current traveling lane (i.e., a leading vehicle). In these situations, the ECU 14 can be configured to take the position and/or speed of the leading vehicle into consideration (e.g., based on data acquired by the distance-sensing device 18) when automatically adjusting the speed of the host vehicle 10. In particular, the ECU 14 can be configured to take the leading vehicle into consideration to keep the host vehicle 10 a safe predetermined distance from the leading vehicle. For example, in situations where the leading vehicle slows due to traffic congestion nearing the on-ramp, the ECU 14 can be configured to prioritize the leading vehicle (i.e., maintain a predetermined distance between the host vehicle and the leading vehicle) and not attempt to accelerate to allow a merging vehicle merge from the on-ramp.

In some embodiments, the host vehicle 10 includes a human-machine interface ("HMI") that warns a user of the host vehicle 10 if the functionality of the ECU 14 described above (or portions thereof) are unavailable or limited due to various situations, such as sensor failures or environmental effects (e.g., snow, heavy rain, etc.). The HMI can be mounted in an instrument cluster or panel of the host vehicle 10 and can warn the user using visual and/or audible warnings.

Figure 10:
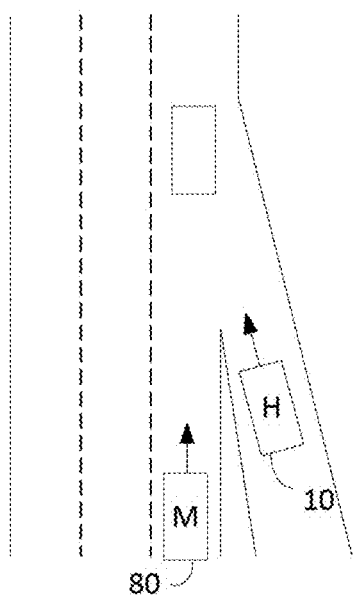
FIG. 10 schematically illustrates vehicle speed control performed by the adaptive cruise control system of FIG. 1 to increase the speed of the host vehicle to allow the host vehicle to merge with a lane of traffic from an on-ramp.

Thus, embodiments of the invention provide, among other things, systems and methods for performing adaptive cruise control or autonomous vehicle control to handle merging situations. In particular, the systems and methods use image data to identify merging lanes and merge locations located around a host vehicle and use radar data to identify if a merging vehicle is in the merging lane. If a merging vehicle is in the merging lane, the systems and methods automatically adjust a speed of the host vehicle to prevent a collision with the merging vehicle. It should be understood that the systems and methods described herein can be used by the host vehicle 10 when another vehicle is merging with the host vehicle's current lane of travel (see, e.g., FIGS. 5*b*, 6, and 7) and when the host vehicle 10 is in lane that merges with another vehicle's current lane of travel (see, e.g., FIGS. 5*a* and 10).

Various features and advantages of the invention are set forth in the following claims.

What is claimed is:

1. A method of controlling a speed of a host vehicle, the method comprising:
   detecting an upcoming merging lane based on a point where two lane marking lines converge followed by a missing lane marking line identified in an image of a road surface captured by a forward-facing image sensor mounted on the host vehicle;

receiving a merge location, the merge location being the location where the merging lane merges with a lane where the host vehicle is currently traveling based on the point where the two lane marking lines converge;

detecting a merging vehicle on the upcoming merging lane;

determining a speed of the merging vehicle; and automatically, at a control unit, adjusting a speed of the host vehicle based on the speed of the merging vehicle.

2. The method of claim 1, further comprising receiving radar data and wherein detecting the merging vehicle includes analyzing the radar data to detect the merging vehicle.

3. The method of claim 1, further comprising determining a position of the merging vehicle and wherein the act of automatically adjusting the speed of the host vehicle includes automatically adjusting the speed of the host vehicle based on the speed of the merging vehicle and the position of the merging vehicle.

4. The method of claim 3, wherein automatically adjusting the speed of the host vehicle based on the speed of the merging vehicle and the position of the merging vehicle includes determining an estimated time when the merging vehicle will reach the merge location based the speed of the merging vehicle and the position of the merging vehicle;

determining an estimated position of the host vehicle at the estimated time based on a current speed and a current position of the host vehicle; and automatically adjusting a speed of the host vehicle when the estimated position of the host vehicle at the estimated time is within a threshold distance from the location.

5. The method of claim 4, wherein automatically adjusting the speed of the host vehicle includes increasing the speed of the host vehicle when the estimated position of the host vehicle at the estimated time is beyond the merge location.

6. The method of claim 4, wherein automatically adjusting the speed of the host vehicle includes decreasing the speed of the host vehicle when the estimated position of the host vehicle at the estimated time is before the merge location.

7. The method of claim 1, wherein automatically adjusting the speed of the host vehicle includes increasing the speed of the host vehicle when the host vehicle is closer to the merge location than the merging vehicle.

8. The method of claim 1, wherein automatically adjusting the speed of the host vehicle includes increasing the speed of the host vehicle when (i) the host vehicle is closer to the merge location than the merging vehicle and (ii) a distance between the host vehicle and the merging vehicle is less than a threshold distance.

9. The method of claim 1, wherein automatically adjusting the speed of the host vehicle includes increasing the speed of the host vehicle when (i) the host vehicle is closer to the merge location than the merging vehicle, (ii) a distance between the host vehicle and the merging vehicle is less than a threshold distance, and (iii) a current speed of the host vehicle is less than a maximum speed.

10. The method of claim 9, wherein the maximum speed is a sum of a target speed of the host vehicle and a speed difference threshold.

11. The method of claim 1, wherein automatically adjusting the speed of the host vehicle includes decreasing the speed of the host vehicle when a first distance between the host vehicle and the merge location is greater than a second distance between the merging vehicle and the merge location.

12. The method of claim 1, wherein automatically adjusting the speed of the host vehicle includes decreasing the speed of the host vehicle when (i) a first distance between the host vehicle and the merge is greater than a second distance between the merging vehicle and the merge location, and (ii) a second distance between the host vehicle and the merging vehicle is less than a threshold distance.

13. The method of claim 1, wherein the automatically adjusting the speed of the host vehicle includes decreasing the speed of the host vehicle when (i) a first distance between the host vehicle and the merge location is greater than a second distance between the merging vehicle and the merge location, (ii) a third distance between the host vehicle and the merging vehicle is less than a threshold distance, and (3) a current speed of the host vehicle is greater than a minimum speed.

14. The method of claim 13, wherein the minimum speed is a difference between a target speed of the host vehicle and a speed difference threshold.

15. A system for controlling a speed of a host vehicle, the system comprising:

a control unit;

at least one forward-facing image device mounted on the host vehicle and configured to capture an image of a road surface, identify lane marking lines in the image indicating an upcoming merging lane based on a point where two lane marking lines converge followed by a missing lane marking line, and identify a merge location where the upcoming merging lane merges with a lane where the host vehicle is currently traveling, based on the point where the two lane marking lines converge, and transmit a first signal to the control unit based on the identified upcoming merging lane and the merge location; and at least one distance-sensing device mounted on the host vehicle and configured to detect a merging vehicle on the upcoming merging lane, determine a speed of the merging vehicle, determine a position of the merging vehicle, and transmit a second signal to the control unit based the speed of the merging vehicle and the position of the merging vehicle, wherein the control unit is configured to automatically adjust a speed of the host vehicle based on the first and second signal.

16. The system of claim 15, wherein the control unit is configured to automatically adjust the speed of the host vehicle by determining an estimated time when the merging vehicle will reach the merge location based the speed and the position of the merging vehicle;

determining an estimated position of the host vehicle at the estimated time based on a current speed and a current position of the host vehicle; and automatically adjusting a speed of the host vehicle when the estimated position of the host vehicle at the estimated time is within a threshold distance from the merge location.

17. The system of claim 16, wherein the control unit is configured to automatically adjust the speed of the host vehicle by increasing the speed of the host vehicle when the estimated position of the host vehicle at the estimated time is beyond the merge location.

18. The system of claim 16, wherein the control unit is configured to automatically adjust the speed of the host vehicle by decreasing the speed of the host vehicle when the estimated position of the host vehicle at the estimated time is before the merge location.

19. The system of claim 15, wherein the control unit is configured to automatically adjust the speed of the host vehicle based on a position of a vehicle detected ahead of the host vehicle in the lane where the host vehicle is currently traveling.

20. A method of controlling a speed of a vehicle, the method comprising:
   when a first vehicle is traveling in a merging lane, identifying a merge location of a lane of travel into which the merging lane merges based on a point where two lane marking lines converge followed by a missing lane marking line identified in an image of a road surface captured by a forward-facing image sensor mounted on the first vehicle;
   detecting a second vehicle traveling in the lane of travel;
   determining a speed of the second vehicle traveling in the upcoming lane of travel; and
   automatically, at a control unit, adjusting a speed of the first vehicle based on the speed of the second vehicle traveling in the upcoming lane of travel.

* * * * *